(12) United States Patent
Du et al.

(10) Patent No.: US 9,382,427 B2
(45) Date of Patent: Jul. 5, 2016

(54) SILANE-CONTAINING PIGMENT PARTICLES FOR ELECTROPHORETIC DISPLAY

(75) Inventors: Hui Du, Milpitas, CA (US); Haiyan Gu, Fremont, CA (US); Xiaojia Wang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 1239 days.

(21) Appl. No.: 13/157,209

(22) Filed: Jun. 9, 2011

(65) Prior Publication Data

US 2012/0313049 A1    Dec. 13, 2012

(51) Int. Cl.

| | |
|---|---|
| *C09B 67/08* | (2006.01) |
| *C09C 3/10* | (2006.01) |
| *G02F 1/167* | (2006.01) |
| *C09C 1/56* | (2006.01) |
| *C09C 3/00* | (2006.01) |
| *C09C 3/12* | (2006.01) |
| *H01B 1/12* | (2006.01) |

(52) U.S. Cl.
CPC ............... *C09B 67/0013* (2013.01); *C09C 1/56* (2013.01); *C09C 3/006* (2013.01); *C09C 3/10* (2013.01); *C09C 3/12* (2013.01); *G02F 1/167* (2013.01); *G02F 2001/1678* (2013.01)

(58) Field of Classification Search
CPC .................................. H01B 1/12; C08F 20/18
USPC .......................................... 252/500; 526/194
See application file for complete search history.

(56) References Cited

U.S. PATENT DOCUMENTS

| 6,930,818 B1 | 8/2005 | Liang et al. | |
|---|---|---|---|
| 2006/0024437 A1 | 2/2006 | Pullen et al. | |
| 2007/0231566 A1* | 10/2007 | Yoneyama et al. | 428/331 |
| 2008/0233315 A1* | 9/2008 | Aoshima et al. | 428/32.1 |
| 2008/0248413 A1* | 10/2008 | Ishii et al. | 430/48 |
| 2009/0009852 A1 | 1/2009 | Honeyman et al. | |
| 2010/0289736 A1 | 11/2010 | Feick et al. | |
| 2010/0319971 A1* | 12/2010 | Lin | 174/258 |
| 2011/0105666 A1* | 5/2011 | Okada | 524/408 |
| 2012/0229885 A1* | 9/2012 | Chen et al. | 359/296 |

FOREIGN PATENT DOCUMENTS

| WO | WO 01/67170 | 9/2001 |
|---|---|---|
| WO | WO 02/093246 A1 | 11/2002 |
| WO | WO2010148061 | 12/2010 |

OTHER PUBLICATIONS

Machine translation of CN 101738814 A. Chen et al. "Electrophoresis disclosing solution and preapriton method thereof". Published Jun. 16, 2010. 30 Pages Total . . . .*
U.S. Appl. No. 13/149,599, filed May 31, 2011, Du et al.

(Continued)

*Primary Examiner* — Mark Kopec
*Assistant Examiner* — Danny N Kang
(74) *Attorney, Agent, or Firm* — Perkins Coie LLP

(57) ABSTRACT

The present invention is directed to an electrophoretic display fluid, in particular, pigment particles dispersed in a solvent or solvent mixture, and methods for their preparation. The pigment particles generated, according to the present invention, are stable in solvent under an electric field and can improve the performance of an electrophoretic display.

21 Claims, 6 Drawing Sheets

(56) References Cited

OTHER PUBLICATIONS

Sprague, R.A. (Sep. 23, 2009) SiPix Microcup Electrophoretic Epaper for Ebooks. *NIP* 25, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA.).

Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.

Zang, H.M. (Feb. 2007) *Developments in Microcup® Flexible Displays*. Presentation conducted at the 6th Annual Flexible Display and Microelectronics Conference, Phoenix, AZ Feb. 6-8.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Zang, H.M. (Sep. 2006) *Monochrome and Area Color Microcup® EPDs by Roll-to-Roll Manufacturing Process*. Presentation conducted at the Fourth Organic Electronics Conference and Exhibition (OEC-06), Sep. 25-27, 2006, Frankfurt, Germany.

Wang, X., Zang, H.M. and Li, P. (Jun. 2006) Roll-to-Roll Manufacturing Process for Full Color Electrophoretic film. *SID Digest*, 00pp. 1587-1589.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Liang, R.C., (Feb. 2005) *Flexible and Roll-able Displays/Electronic Paper—A Brief Technology Overview*. Flexible Display Forum, 2005, Taiwan.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Ho, Candice. (Feb. 1, 2005) *Microcupt® Electronic Paper Device and Application*. Presentation conducted at USDC 4th Annual Flexible Display Conference 2005.

Bardsley, J.N. & Pinnel, M.R. (Nov. 2004) Microcup™ Electrophoretic Displays. USDC Flexible Display Report, 3.1.2. pp. 3-12-3-16.

Liang, R.C. (Oct. 2004) *Flexible and Roll-able Displays/Electronic Paper—A Technology Overview*. Paper presented at the METS 2004 Conference in Taipie, Taiwan.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Zang, H.M. (Feb. 2004). *Microcup Electronic Paper*. Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE—IS&T Electronic Imaging, SPIE* vol. 5289, 102-108.

Ho, C., & Liang, R.C. (Dec. 2003). *Microcup® Electronic Paper by Roll-to-Roll Manufacturing Processes*. Presentation conducted at FEG, Nei-Li, Taiwan.

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Allen, K. (Oct. 2003). Electrophoretics Fulfilled. *Emerging Displays Review: Emerging Display Technologies*, Monthly Report—Oct. 2003, 9-14.

Zang, H.M., & Liang, R.C. (2003) Microcup Electronic Paper by Roll-to-Roll Manufacturing Processes. *The Spectrum*, 16(2), 16-21.

Chen, S.M. (Jul. 2003) The Applications for the Revolutionary Electronic Paper Technology. *OPTO News & Letters*, 102, 37-41. (in Chinese, English abstract attached).

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Chen, S.M. (May 2003) The New Application and the Dynamics of Companies. *TRI*. 1-10. (In Chinese, English abstract attached).

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., & Tseng, S. (Feb. 2003). *Microcup® LCD, A New Type of Dispersed LCD by A Roll-to-Roll Manufacturing Process*. Paper presented at the IDMC, Taipei, Taiwan.

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., Hou, J., & Zang, H.M. (Dec. 2002) Microcup Electrophoretic Displays by Roll-to-Roll Manufacturing Processes. *IDW*, EP2-2, 1337-1340.

Nikkei Microdevices. (Dec. 2002) Newly-Developed Color Electronic Paper Promises—Unbeatable Production Efficiency. *Nikkei Microdevices*, p. 3. (in Japanese, with English translation).

\* cited by examiner

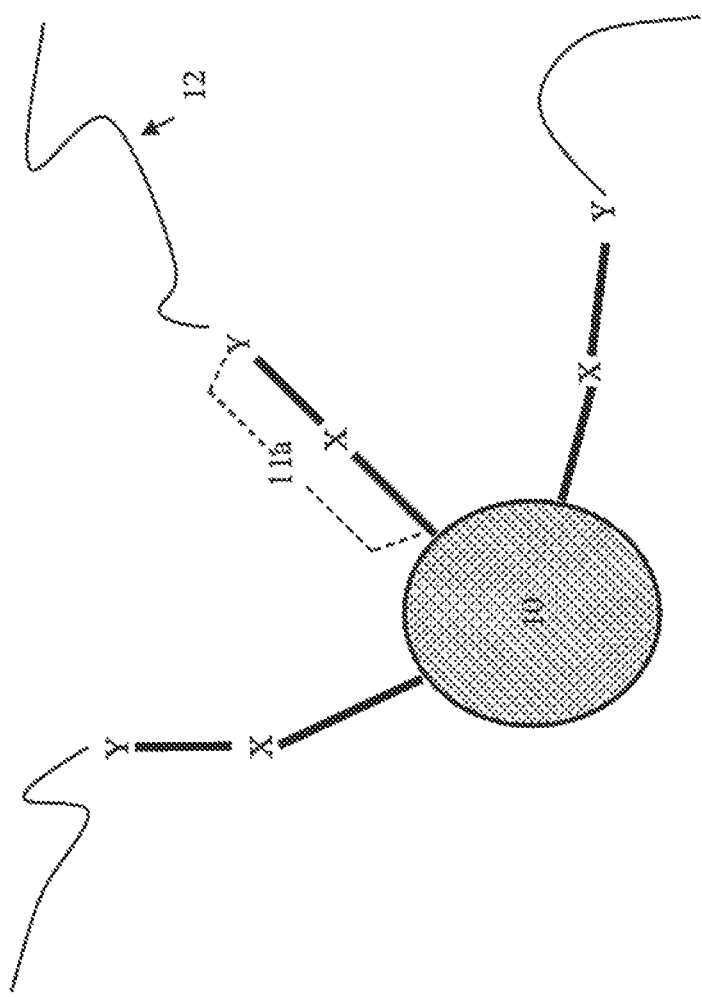

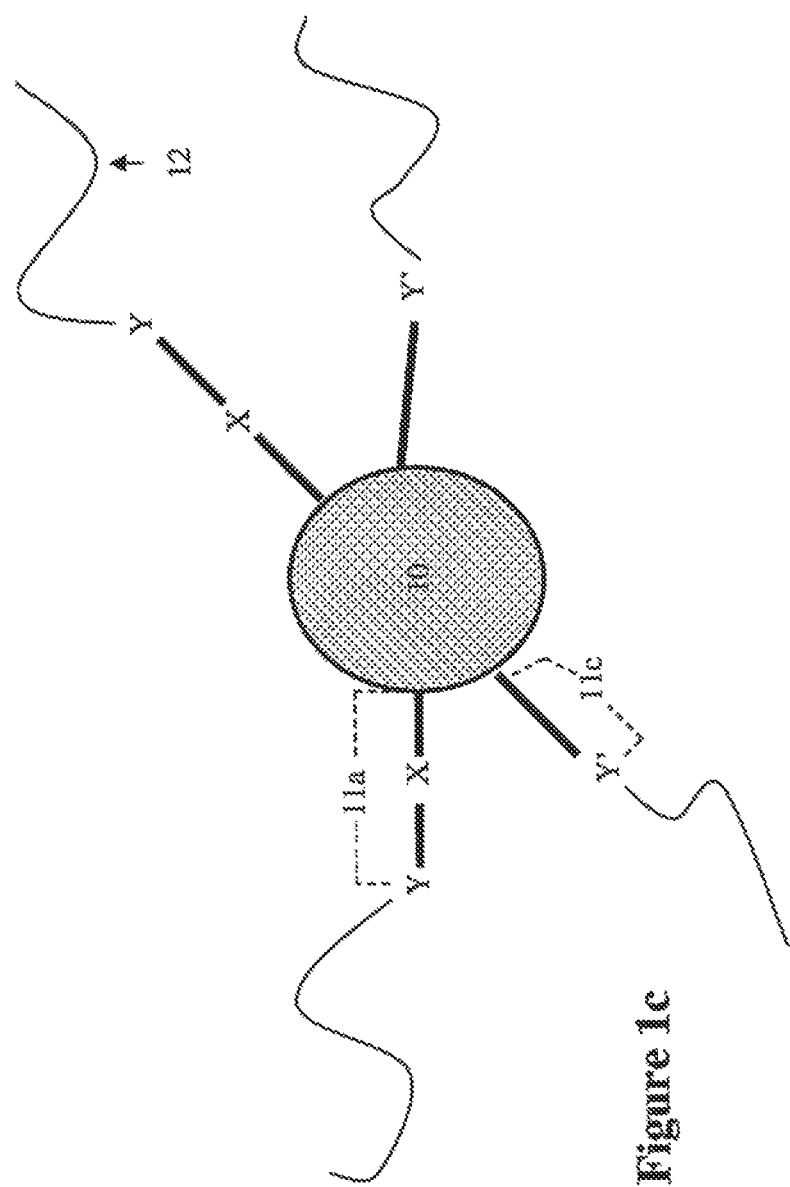

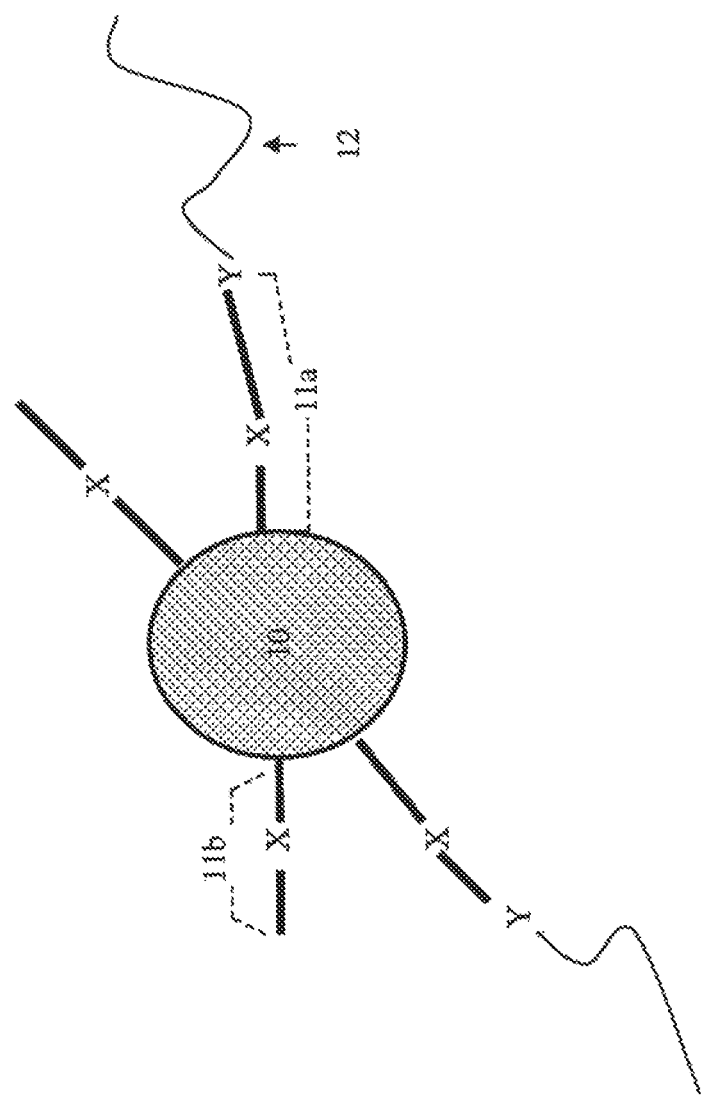

US 9,382,427 B2

SILANE-CONTAINING PIGMENT PARTICLES FOR ELECTROPHORETIC DISPLAY

FIELD OF THE INVENTION

The present invention is directed to pigment particles, an electrophoretic fluid and an electrophoretic display utilizing the electrophoretic fluid, and methods for their preparation.

BACKGROUND OF THE INVENTION

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the particles to migrate back to the opposite plate, thereby reversing the color.

Alternatively, an electrophoretic fluid may have two types of pigment particles of contrasting colors and carrying opposite charges and the two types of pigment particles are dispersed in a clear solvent or solvent mixture. In this case, when a voltage difference is imposed between the two electrode plates, the two types of pigment particles would move to opposite ends (top or bottom) in a display cell. Thus one of the colors of the two types of pigment particles would be seen at the viewing side of the display cell.

For all types of the electrophoretic displays, the fluid contained within the individual display cells of the display is undoubtedly one of the most crucial parts of the device. The composition of the fluid determines, to a large extent, the lifetime, contrast ratio, switching rate and bistability of the device.

In an ideal dispersion, the charged pigment particles remain separate and do not agglomerate or stick to each other or to the electrodes, under all operating conditions. In addition, all components in the fluid must be chemically stable and compatible with the other materials present in an electrophoretic display.

BRIEF DISCUSSION OF THE DRAWINGS

FIG. 1a-1d illustrate pigment particles of the present invention.

SUMMARY OF THE PRESENT INVENTION

Figure 1B:
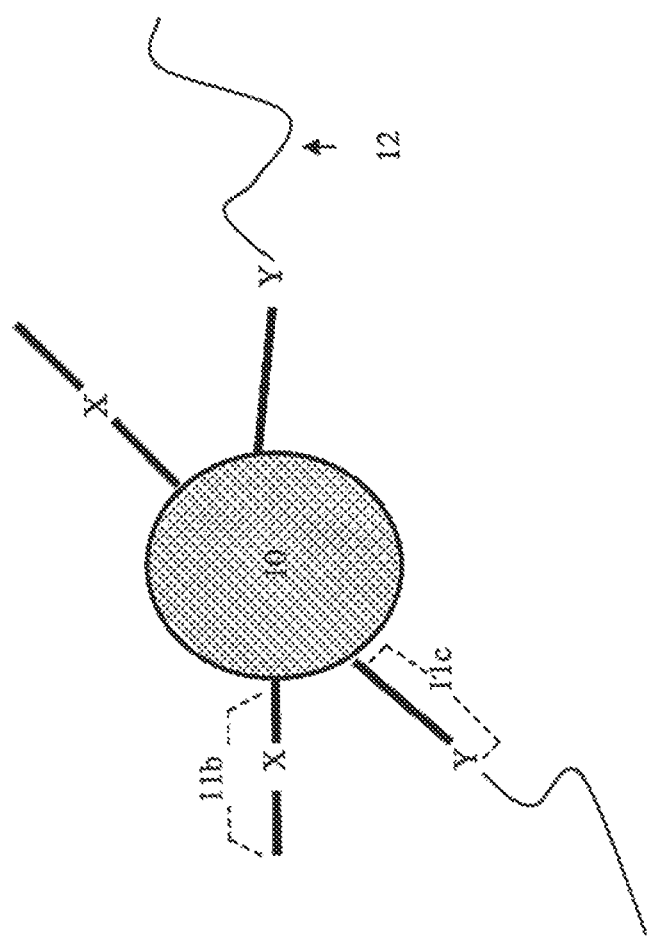

The first aspect of the present invention is directed to a pigment particle suitable for use in an electrophoretic display, which pigment particle comprises a core pigment particle, one inner layer and one outer layer, wherein the inner layer comprises at least one silane linking moiety comprising at least one polar group and the outer layer comprises polymer stabilizers.

In one embodiment, the core pigment particle is an organic, inorganic or polymeric pigment particle.

In one embodiment, the core pigment particle is a black pigment particle.

In one embodiment, the inner layer is about 4% to about 7%, by weight, based on the total weight of the pigment particle.

In one embodiment, the outer layer is about 1.5% to about 3.5%, by weight, of the total particle weight.

In one embodiment, the surface of the core pigment particle is coupled with a silane moiety comprising a polar group and a polymer linking end group and the pigment particle further comprises polymer stabilizers attached to the surface of the particle through the polymer linking end group.

In one embodiment, the surface of the core pigment particle is coupled with a silane moiety comprising a polar group and a polymer linking end group and a second silane moiety comprising a polar group without a polymer linking end group.

In one embodiment, the surface of the core pigment particle is coupled with a silane moiety comprising a polar group and a polymer linking end group and a second silane moiety comprising a polymer linking end group without a polar group.

In one embodiment, the surface of the core pigment particle is coupled with a silane moiety comprising a polar group without a polymer linking end group and a second silane moiety comprising a polymer linking end group without a polar group.

In one embodiment, the polar group is —NH—.

In one embodiment, the polar group is —OH— or —COOH.

In one embodiment, the silane moiety comprises more than one polar group and/or more than one polymer linking end group.

In one embodiment, the polymer linking end group is a vinyl, acrylate or methacrylate group.

In one embodiment, the polymer stabilizers are formed from polyethylene, polypropylene, polyacrylate, polyurethane, polyester or polysiloxane.

In one embodiment, the polymer stabilizers are formed from lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate or n-octadecyl methacrylate.

In one embodiment, the outer layer is a cross-linked polymer network.

The second aspect of the present invention is directed to an electrophoretic fluid comprising charged pigment particles of the present invention.

The third aspect of the present invention is directed to a display device comprising display cells filled with an electrophoretic fluid of the present invention.

DETAILED DESCRIPTION OF THE INVENTION

An electrophoretic display relies on the movement of charged pigment particles under an electric field to display images. The solvent or solvent mixture to disperse the charged pigment particles is usually an organic solvent with a low dielectric constant.

The core pigment particles suitable for the present invention may be organic or inorganic pigment particles. The particles may also be of any colors. Examples of suitable white core particles may include, but are not limited to, $TiO_2$, $ZrO_2$, ZnO or $Al_2O_3$. Examples of suitable black core particles may include, but are not limited to, Cl pigment black 26 or 28 or the like (e.g., manganese ferrite black spinel or copper chromite black spinel), iron oxide with or without thin coating of $SiO_2$, $Al_2O_3$ or $ZrO_2$, titanium black (Titan Black, Mitsubishi Materials electronics Chemicals) or carbon black.

The core particles may also be an inorganic color pigment, such as natural iron oxide or synthetic iron oxide, cadmium barium selenosulphite, cerium sulfide, red hematite, chrome pigment, iron blue pigment, cadmium pigment or the like. They may also be an organic color pigment, such as phthalocyanine blue, phthalocyanine green, diarylide yellow, diarylide AAOT yellow, and quinacridone, azo, rhodamine or perylene pigment series from Sun Chemical, Hansa yellow G particles from Kanto Chemical or Carbon Lampblack from Fisher.

FIG. 1*a* illustrates one embodiment of the present invention wherein the particle surface of a core pigment particle (10) is coupled with a silane moiety (11*a*) which comprises a polar group (X) and a polymer linking end group (Y). The particle of such a structure can be easily dispersed in a solvent due to the presence of the polymer stabilizers (12) linked to the core pigment particle surface through the polymer linking end group (Y) on the silane moiety.

The silane moiety is coupled to the core pigment particle surface through reactive sites on the particle surface. The reactive sites may be hydroxyl groups, amine groups, carboxylic acid groups or derivatives thereof (e.g., amides or esters), alcohol or phenol groups or halogens which are present on the surface of an organic pigment particle. Different organic pigment materials will have different functionalities due to their own chemical structures.

Typical inorganic particle surface may also have natural reactive sites (e.g., hydroxyl groups) existing in ambient environment. The reactive sites may also be planted onto the surface of the inorganic particles by conventional means or by special treatment such as hydration as described in U.S. Ser. No. 13/149,599 filed on May 31, 2011, the content of which is incorporated herein by reference in its entirety.

The silane coupling reagent useful for the preparation of the pigment particle of FIG. 1*a* may be expressed as follows:

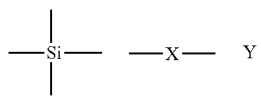

(I)

The polar group (X) on the silane moiety may contribute charge to the particle surface. For example, polar groups such as —NH— may contribute a positive charge to the particle surface and polar groups such as —OH or —COOH may contribute a negative charge to the particle surface.

It is also noted that there may be more than one polar group (X) and/or more than one polymer linking end group (Y) on a silane coupling agent.

The charge contributed by the polar group may be effected optionally in the presence of a charge controlling agent, such as Solsperse 17000 (active polymeric dispersant), Solsperse 9000 (active polymeric dispersant), OLOA 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate).

The polymer linking end group (Y) may be a vinyl, acrylate, methacrylate group or the like.

One of such silane coupling agents is shown below which comprises two —NH-polar groups and one vinyl polymer linking end group.

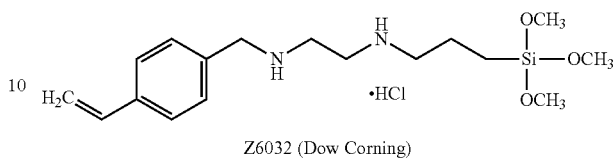

Z6032 (Dow Corning)

Other silane coupling agents of Formula (I) may include, but are not limited to N-(3-acryloxy-2-hydroxypropyl)-3-aminopropyltriethoxysilane (Gelest), 3-(N-allylamino)propyltrimethoxysilane (Gelest), 3-(N-styrylmethyl-2-aminoethylamino)-propyltrimethoxysilane (Gelest) or vinylbenzylaminoethylaminopropyl-trimethoxysilane (Z-6032, by Dow Corning).

The reaction conditions for the silane coupling reaction in general are known in the art and in this case, specific conditions would depend on the type of the coupling agent and the type of the pigment particles.

After the coupling reaction, the silane linking moiety on the particle surface, especially the polymer linking end group (Y), is then available to react with monomers, oligomers or polymers to form polymer stabilizers.

The polymer stabilizers are desired to create a steric barrier of about 1 nm to about 50 nm, preferably about 5 nm to about 30 nm, and more preferably about 10 nm to about 20 nm, in thickness, on the core pigment particle surface.

Suitable polymers, in the context of the present invention, may include, but are not limited to, polyethylene, polypropylene, polyacrylate, polyurethane, polyester or polysiloxane. Suitable monomers include, but are not limited to, lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate and n-octadecyl methacrylate.

In general, the presence of the polymer stabilizers on the particle surface as shown in the present invention is key to achieve an electrophoretic fluid of good performance. Selection of the material for the polymer stabilizers would depend on the compatibility of the material with the solvent used in an electrophoretic fluid. For example, in a hydrocarbon solvent, a polyester may not stabilize the particles in it, while an acrylate can provide a stable dispersion.

The polymer stabilizers formed from the monomers, oligomers or polymers may have a single chain or a branched chain. They may also have different configurations, such as coils, stretched chains or irregular tangled chains on the particle surface, depending on compatibility of the polymer with the solvent in which the particles are dispersed and/or the density and length of the polymer chains. The polymer stabilizers may also have brush- or fiber-like structures.

On the surface of the pigment particles, there may be only one single type of the polymer stabilizers or several types of polymer stabilizers of different structures.

The polymer stabilizers may also be cross-linked in the presence of a cross-linking agent to form a polymer network over the surface of the pigment particles.

FIG. 1*b* illustrates another embodiment of the present invention. As shown, there are two different types (11*b* and 11*c*) of silane moiety attached to the surface of a core pigment particle (10).

One of the silane linking moieties (11b) has a polar group (X), but with no polymer linking end group. The polar group may be any one of those described above for contributing the charge to the pigment particle. The silane linking moieties 11b may be formed from silane coupling agents including, but not limited to, aminopropyltrimethoxysilane (Gelest), N-(2-aminoethyl)-3-aminopropyltrimethoxysilane (Gelest) or N-(2-aminoethyl)-11-aminoundecyltrimethoxysilane (Gelest). The amino containing silane coupling agents named may induce a positive charge on the particle surface.

Silane coupling agents such as acryloxypropyltrimethoxysilane (Z6030, Dow Corning), bis(2-hydroxyethyl)-3-aminopropyltriethoxysilane (Gelest), N-(3-triethoxysilylpropyl)-o-polyethylene oxide urethane (Gelest) or the like may induce a negative charge on the particle surface.

The other silane linking moiety 11c comprises a polymer linking end group (Y) without a polar group, to allow bonding of polymer stabilizers (12) to the silane moiety. This type of silane coupling agents may include, but are not limited to, allyltriethoxysilane, allyloxyundecyltrimethoxysilane, (3-acryloxypropyl)trimethoxysilane or methacryloxyloxypropyltrimethoxysilane.

FIG. 1c is illustrates a further embodiment of the present invention. As shown, there are two types (11a and 11c) of silane linking moiety attached to the surface of the core pigment particle (10). One of the silane linking moiety (11a) comprises both the polar group (X) and the polymer linking end group (Y) while the other silane linking moiety (11c) comprises only the polymer linking end group (Y'). In this case, the polymer linking end groups Y and Y' may be the same or different.

The silane moieties (11a) having both the polar group (X) and the polymer linking end group (Y) are those as described for the pigment particle of FIG. 1a.

The other type of silane moiety (11c) having only the polymer linking end group (Y') are those as described for the pigment particle of FIG. 1b.

As an example for the embodiment of FIG. 1c, one silane coupling agent may be N-(3-acryloxy-2-hydroxypropyl)-3-aminopropyltriethoxysilane (Gelest) or 3-(N-allylamino)propyltrimethoxysilane (Gelest), each of which has an amino polar group and a vinyl end group and the other silane coupling agent may be (3-acryloxypropyl)trimethoxysilane or methacryloxyloxypropyl-trimethoxysilane.

FIG. 1d illustrates a further embodiment of the present invention. As shown, there are two types (11a and 11b) of silane linking moiety attached to the surface of the pigment particle (10). One of the silane linking moiety (11a) comprises both the polar group (X) and the polymer linking end group (Y) while the other silane linking moiety (11b) comprises only the polar group (X'). In this case, the polar groups X and X' may be the same or different.

The silane moieties (11a) having both the polar group (X) and the polymer linking end group (Y) are those as described for the pigment particle of FIG. 1a.

The other type of silane moiety (11b) having only the polar group (X') are those as described for the pigment particle of FIG. 1b.

As an example for the embodiment of FIG. 1d, one silane coupling agent may be N-(3-acryloxy-2-hydroxypropyl)-3-aminopropyltriethoxysilane (Gelest) or 3-(N-allylamino)propyltrimethoxysilane (Gelest), each of which has an amino polar group and a vinyl end group and the other silane coupling agent may be aminopropyltrimethoxysilane (Gelest) or N-(2-aminoethyl)-3-aminopropyltrimethoxysilane.

The silane coupling reaction and the surface grafting or polymerization for the pigment particle of FIG. 1b, 1c or 1d may be carried out as described above for the pigment particle of FIG. 1a.

Figure 2:
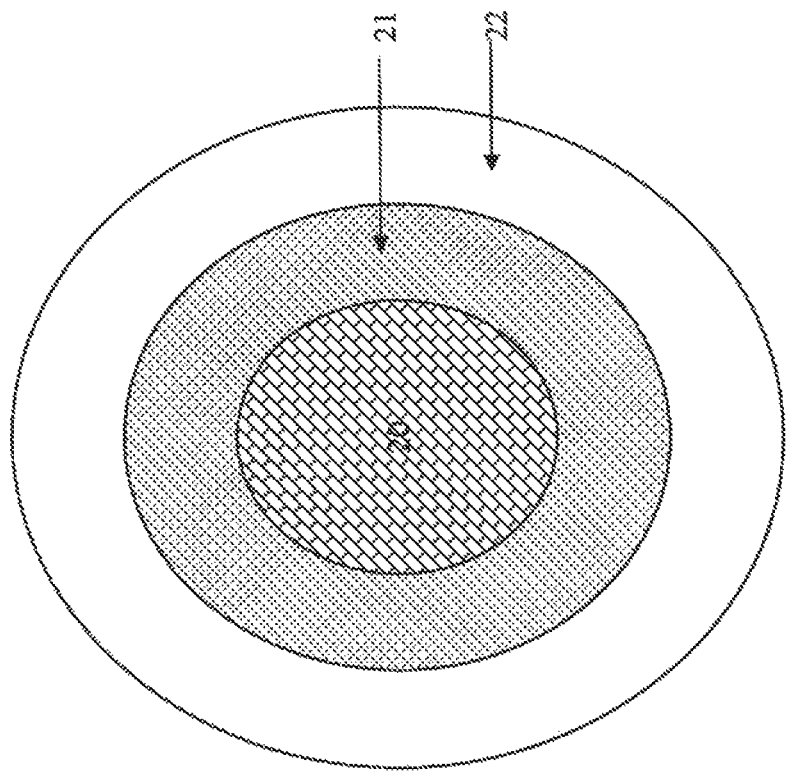
FIG. 2 is a general depiction of a pigment particle of the present invention.

FIG. 2 is a general depiction of a pigment particle of the present invention. The core pigment particle (20) is surrounded by one inner layer (21), which is a layer comprising a silane linking moiety which comprises the polar group thus influencing charge of the pigment particle. The inner layer is surrounded by an outer layer (22) which is the layer comprising the polymer stabilizers.

The weight percentage of each of the two layers (21 and 22) in the total particle weight needs to be optimized to ensure good particle dispersion and acceptable bistability for a display device. The optimum range for the silane inner layer (21) is about 4% to about 7%, more preferably about 5% to about 6.5%, by weight, based on the total particle weight (including the core pigment particle and the two layers), and the nonpolar outer layer (22) comprising the polymer stabilizers is about 1.5% to about 3.5%, more preferably about 2% to about 3% by weight, of the total particle weight.

The term "about" in the context of the present invention refers to ±5% of the indicated value.

In general, the amount of the silane moiety on the particle surface has an impact on intensity of the particle charge, which in turn will result in different switching speeds of the particle. When the silane coupling moiety has only one polar group, the induced charge will not be as high as a silane coupling moiety has two polar groups.

If the polymer content (22) is higher than the indicated range, the bistability of the display device may suffer. But if the polymer content is too low, the particles may be difficult to be dispersed in a solvent at an acceptable particle size.

Therefore by carefully choosing the types of silane linking moiety and the polymer used, and/or by adjusting the ratio between the two different types of the silane coupling moiety in FIG. 1b, 1c or 1d, a right balance between the intensity of the charge and the steric stabilization of particles may be achieved.

Another aspect of the present invention is directed to an electrophoretic fluid comprising pigment particles as described above dispersed in a solvent or solvent mixture. The fluid may comprise only one type of pigment particles or two types of pigment particles of contrast colors and carrying opposite charge polarities. In a two-particle system, at least one type of the particles is prepared according to the present invention.

The solvent or solvent mixture in which the pigment particles are dispersed preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200). The solvent or solvent mixture may be colored by a dye or pigment.

In an electrophoretic fluid comprising two types of pigment particles carrying opposite charge polarities and are of contrast colors, the particles preferably have a polymer layer on their surface to prevent them from sticking to each other. The polymer stabilizers would serve this purpose. Otherwise, in the case of a black/white display device, the reflectance at the white and black states will suffer.

A further aspect of the invention is directed to an electrophoretic display wherein the display cells are filled with an electrophoretic fluid as described above. The term "display cell" is intended to refer to a micro-container which is individually filled with a display fluid. Examples of "display cell" include, but are not limited to, microcups, microcapsules, micro-channels, other partition-typed display cells and equivalents thereof.

EXAMPLES

Example 1

Pigment Particles with One Type of Silane Coupled to Surface

To a reaction flask, Black 444 (Shepherd, 100 g), isopropanol (600 mL) and deionized water (3 g) were added and sonicated for 30 minutes, followed by the addition of vinylbenzylaminoethylaminopropyltrimethoxysilane (Z-6032, by Dow Corning, 50 g). The reactor was heated to 65° C. with magnetic stirring. After 24 hours, the mixture was centrifuged at 6000 rpm for 10 minutes. The solids were re-dispersed in isopropanol (300 mL), centrifuged and dried at 50° C. under vacuum overnight to produce the silane treated pigment particles.

The particles prepared from above steps and 400 g of toluene were mixed well, and the mixture was added to a reactive flask, followed by the addition of ethylhexyl acrylate (120 g) and azobisisobutyronitrile (AIBN, 0.3 g). The flask was purged with nitrogen for 20 minutes and then heated to 70° C. After 19 hours, the polymer coated-particles were recovered by centrifugation at 6000 rpm for 10 minutes. The solids were dried at 50° C. under vacuum to produce the final product.

Example 2

Pigment Particles with Two Types of Silane Coupled to Surface

Black 444 (Shepherd) 50 g was mixed with 400 g of isopropanol and 12 g of water. Then 15 g of 3-(methacryloxyl) propyltrimethoxysilane (Z6030, Dow Corning) was added into the mixture. The container was put in an ultrasonic bath at temperature of 65° C. The mixture was also stirred with mechanical stirrer for 2 hours. Then 15 g of aminopropyltrimethoxysilane was added into the dispersion and continue sonication for 2 hours. After reaction, the solids were separated from the liquid through centrifugation and dried in a vacuum oven To a reaction flask, the particles (50 g) prepared from above steps and 200 g of toluene were added and sonicated for 30 minutes, followed by the addition of lauryl acrylate (60 g) and AIBN (0.6 g). The flask was purged with nitrogen for 20 minutes and then heated to 80° C. After 12 hours, the polymer coated-particles were recovered by centrifugation at 6000 rpm for 10 minutes. The solids produced were redispersed in toluene and centrifuged. The solids were dried at room temperature under vacuum to produce the final product.

Example 3

Silane Content on Pigment Surface Verses Switching Speed

The electrophoretic fluid containing 24% by weight of white particles and 4% by weight of black particles and 1% by weight of a charge control agent, Solsperse 17000, was sealed in microcups and laminated on a backplane. The film was driven with 15 volts. The black particles were treated with vinylbenzylaminoethylaminopropyltrimethoxysilane (Z6032, Dow Corning) and then followed by surface polymerization.

Figure 3:
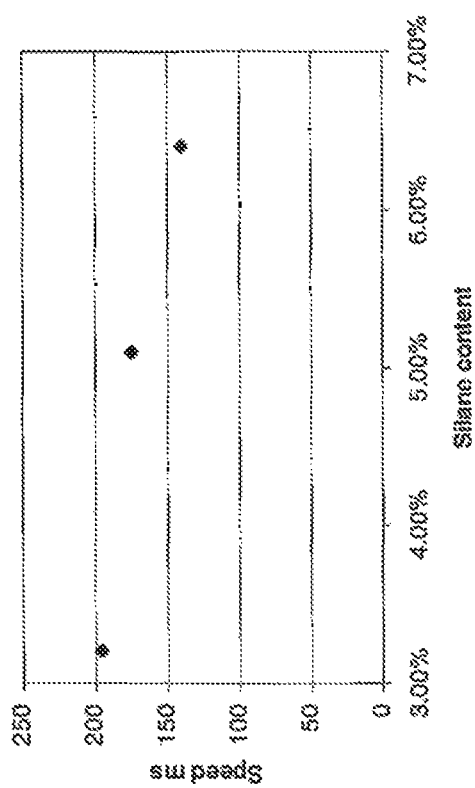
FIG. 3 is a graph showing pigment particles having a higher silane content had a faster switching speed.

FIG. 3 shows that particles with a higher silane content had a faster switching speed.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A pigment particle suitable for use in an electrophoretic display, comprising
    (a) a core pigment particle,
    (b) one inner layer wherein said inner layer comprises at least one silane linking moiety comprising a polar group and a polymer linking end group and is coupled to the surface of the core pigment particle,
    (c) one outer layer wherein said outer layer comprises polymer stabilizers, formed from reaction of monomers, oligomers or polymers, and each is linked to the polymer end linking group on the silane linking moiety, and
    the inner layer is about 4% to about 7% by weight of the total weight of the pigment particle, wherein the total weight of the pigment particle includes the weight of the core pigment particle and the weight of the two layers.

2. The pigment particle of claim 1, wherein said core pigment particle is an organic, inorganic or polymeric pigment particle.

3. The pigment particle of claim 1, wherein said core pigment particle is a black pigment particle.

4. The pigment particle of claim 1, wherein the outer layer is about 1.5% to about 3.5%, by weight, of the total particle weight.

5. The pigment particle of claim 1, wherein said polar group is —NH—.

6. The pigment particle of claim 1, wherein said polar group is —OH or —COOH.

7. The pigment particle of claim 1, wherein the polymer linking end group is a vinyl, acrylate or methacrylate group.

8. The pigment particle of claim 1, wherein the silane moiety is formed from a silane coupling agent selected from the group consisting of N-(3-acryloxy-2-hydroxypropyl)-3-aminopropyltriethoxysilane, 3-(N-allylamino)propyltrimethoxysilane, 3-(N-styrylmethyl-2-aminoethylamino)-propyltrimethoxysilane and vinylbenzylaminoethylaminopropyl-trimethoxysilane.

9. The pigment particle of claim 1, wherein the polymer stabilizers are formed from polyethylene, polypropylene, polyacrylate, polyurethane, polyester or polysiloxane.

10. The pigment particle of claim 1, wherein the polymer stabilizers are formed from lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, or n-octadecyl methacrylate.

11. The pigment particle of claim 1, wherein the outer layer is a cross-linked polymer network.

12. The pigment particle of claim 1, wherein the surface of the core pigment particle is further coupled with a second silane moiety which comprises a second polymer linking end group, but not a polar group.

13. The pigment particle of claim 12, wherein the second polymer linking end group on the second silane moiety is a vinyl, acrylate or methacrylate group.

14. The pigment particle of claim 12, wherein the silane linking moiety is formed from a silane coupling agent of N-(3-acryloxy-2-hydroxypropyl)-3-aminopropyltriethoxysilane or 3-(N-allylamino)propyltrimethoxysilane, and the second silane moiety is formed from a silane coupling agent of (3-acryloxypropyl)trimethoxysilane or methacryloxyloxypropyl-trimethoxysilane.

15. The pigment particle of claim 1, wherein the surface of the core pigment particle is further coupled with a second silane moiety which comprises a polar group, but not a polymer linking end group.

16. The pigment particle of claim 15, wherein the polar group on the second silane moiety is —NH—.

17. An electrophoretic fluid comprising the pigment particles of claim 1 dispersed in solvent or solvent mixture.

18. An electrophoretic fluid comprising the pigment particles of claim 4 dispersed in solvent or solvent mixture.

19. An electrophoretic fluid comprising two types of charged pigment particles, wherein at least one type of the charged pigment particles are the pigment particles of claim 1.

20. An electrophoretic display device comprising display cells filled with an electrophoretic fluid of claim 17.

21. An electrophoretic display device comprising display cells filled with the electrophoretic fluid of claim 19.

* * * * *